E. WEBBER.
MOWING-MACHINE.
No. 178,570. Patented June 13, 1876.
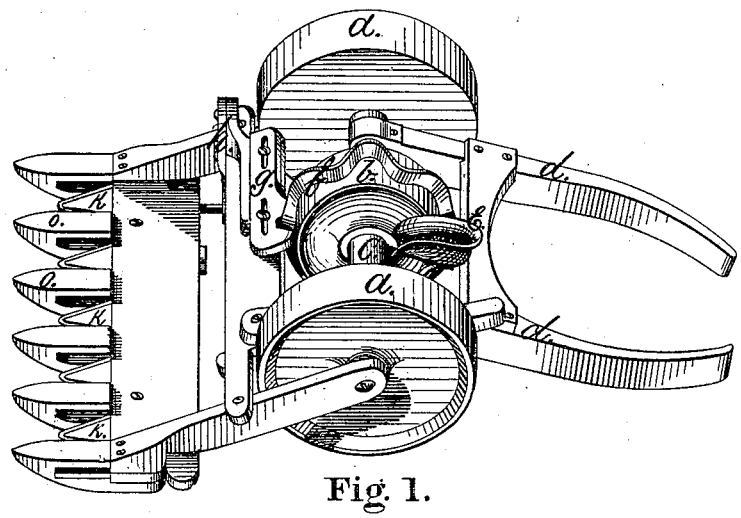
Fig. 1.
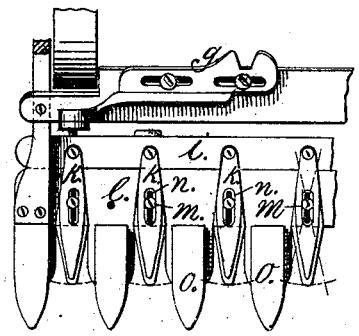
Fig. 3.
Fig. 2.
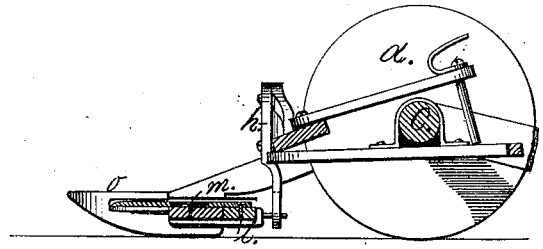
WITNESSES.
J. A. Miller Jr.
L. P. Langworthy
INVENTOR.
Elbridge Webber
by Joseph A. Miller.
Attorney.

UNITED STATES PATENT OFFICE.

ELBRIDGE WEBBER, OF GARDINER, MAINE, ASSIGNOR, BY MESNE ASSIGN-MENTS, OF TWO-THIRDS HIS RIGHT TO HENRY A. STEARNS, OF LINCOLN, RHODE ISLAND.

IMPROVEMENT IN MOWING-MACHINES.

Specification forming part of Letters Patent No. 178,570, dated June 13, 1876; application filed November 3, 1875.

*To all whom it may concern:*

Be it known that I, ELBRIDGE WEBBER, of Gardiner, in the county of Kennebec and State of Maine, have invented certain new and useful Improvements in Mowing-Machines; and I do hereby declare that the following is a full, clear, and exact description thereof, which will enable others skilled in the art to make and use the same, reference being had to the accompanying drawings, forming part of this specification:

This invention has reference to that class of mowing-machines in which the cutters are driven by a zigzag cam secured to the main axle; and consists, first, in the novel arrangement by which the ends of the cutters or knives are made to describe a peculiar curve by which a drawing cut is produced with reference to the stationary edge of the finger-bar; second, in the peculiar manner in which reciprocating or oscillating motion is transmitted to the cutters; third, in the novel manner in which the power is applied to move the mower, as will be more fully set forth hereinafter.

Figure 1 is a perspective view of my improved mower. Fig. 2 is a sectional elevation of the same. Fig. 3 is a plan view of part of the machine, showing the cutter-knives and finger-bar.

Similar letters of reference indicate corresponding parts.

In the drawings, $a\ a$ are the driving-wheels, on which the machine is carried, and by which motion is imparted to the same. $b$ is the drum to which the zigzag cam is secured, or in which a zigzag groove may be made to operate in the same manner as the cam shown. The drum $b$ is secured to the shaft $c$, which is secured to and revolves with the driving-wheels $a\ a$. $d\ d$ are the shaft, in which the draft animal is secured with the head near the mower, so that the same is pushed forward, and not drawn, as usual. E is the driver's seat, placed so that the animal can be conveniently controlled by the driver, while he has also a complete view of the operations of the machine. $f$ is the zigzag cam, by which the cutters are driven without the intervention of other gears. $g$ is the reciprocating slide, engaging with the zigzag cam $f$, and connected by the lever $h$ with the reciprocating bar $i$, the lever $h$ being hinged at a fulcrum on the frame, and one end connected with the slide $g$ and the other with the bar $i$, so that the motion of one is directly communicated to the other. K K K are the cutters or knives, one end of which is secured by pins or screws to the bar $i$, while they are free to move and slide on the pin or screw M secured to the finger-bar. For this purpose an elongated hole or slot, N, is made in the cutters, so that the same may slide on the pin M, and thus, by the reciprocation of the bar $i$, produce a drawing cut with reference to the stationary cutting edge of the finger-bar. O O are the projecting fingers for dividing the grass or grain and protecting the cutters.

When the mower is pushed or drawn over the ground the driving-wheels are rotated, and as they are secured to the shaft $c$, and as the drum $b$, carrying the zigzag cam $f$, is also secured to the shaft $c$, the rotation of the shaft and driving-wheels and zigzag cam $f$ imparts reciprocating motion to the sliding bar $g$, and communicates the same motion to the bar $i$, to which the cutters K K K are hinged by screws or pins.

The cutters do not, as is usually the case, form a rigid part of the cutter-bar, but are made in separate parts, so that each one can be removed singly, nor do they move directly with the cutter-bar, but they slide and oscillate on the pin M secured to the finger-bar about their middle.

When the bar $i$ reciprocates the cutting ends of the knives or cutters K K K are drawn inward at each end of the reciprocation of the bar $i$, and thus produce a peculiar drawing cut by which the power required to cut grass or grain is much reduced.

By securing the draft animal in the rear and pushing the mower before the same all side draft is avoided, and the animal can be easily guided and controlled by the driver.

The construction of this mower is much simplified and the power applied to the cutters in a direct manner, while friction and resistance are reduced to a minimum.

Having thus described my invention, I claim as new and desire to secure by Letters Patent—

The combination of the cutters K K, provided with a slot, N, and a fixed pin, M, and the reciprocating bar $i$, to which the rear ends of the knives are pivoted, substantially as and for the purpose set forth.

ELBRIDGE WEBBER.

Witnesses:
JOSEPH A. MILLER,
HORACE F. HORTON.